United States Patent
Kruse et al.

(10) Patent No.: US 11,558,388 B2
(45) Date of Patent: Jan. 17, 2023

(54) PROVISIONAL COMPUTING RESOURCE POLICY EVALUATION

(71) Applicant: Amazon Technologies, Inc., Seattle, WA (US)

(72) Inventors: William Frederick Hingle Kruse, Seattle, WA (US); Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 464 days.

(21) Appl. No.: 16/384,866

(22) Filed: Apr. 15, 2019

(65) Prior Publication Data

US 2019/0245862 A1 Aug. 8, 2019

Related U.S. Application Data

(63) Continuation of application No. 14/975,204, filed on Dec. 18, 2015, now Pat. No. 10,263,995.

(51) Int. Cl.
*H04L 29/06* (2006.01)
*H04L 9/40* (2022.01)

(52) U.S. Cl.
CPC ............ *H04L 63/102* (2013.01); *H04L 63/20* (2013.01)

(58) Field of Classification Search
CPC .............................. H04L 63/102; H04L 63/20
See application file for complete search history.

(56) References Cited

U.S. PATENT DOCUMENTS

| | | | |
|---|---|---|---|
| 2002/0165960 A1 | 11/2002 | Chan | |
| 2004/0267865 A1* | 12/2004 | Cuervo | H04Q 3/0062 709/200 |
| 2007/0150253 A1 | 6/2007 | Dougherty et al. | |
| 2008/0168527 A1 | 7/2008 | Koved et al. | |
| 2009/0077618 A1 | 3/2009 | Pearce et al. | |
| 2010/0138897 A1 | 6/2010 | Bezilla et al. | |
| 2011/0247048 A1* | 10/2011 | Gill | H04L 45/308 726/1 |
| 2013/0031596 A1* | 1/2013 | Becker | G06F 21/604 726/1 |

(Continued)

OTHER PUBLICATIONS

Ernst & Young, "Identity and access management—Beyond compliance," Insights on governance, risk, and compliance, May 2013, retrieved from https://www.ey.com/publication/vwluassets/identity_and_access_management_-_beyond_compliance/$file/identity_and_access_management_beyond_compliance_au1638.pdf, 24 pages.

(Continued)

*Primary Examiner* — Chau Le
(74) *Attorney, Agent, or Firm* — Davis Wright Tremaine LLP

(57) ABSTRACT

A policy management service receives a request to evaluate a provisional policy to determine the impact of implementation of the provisional policy. The policy management service evaluates an active policy against a request to access a computing resource to determine an authorization decision. The policy management service then evaluates the provisional policy against the request to access the computing resource to generate an evaluation of the provisional policy. The policy management service provides the evaluation and the authorization decision in response to the request to evaluate the provisional policy.

20 Claims, 9 Drawing Sheets

(56) References Cited

U.S. PATENT DOCUMENTS

| | | | |
|---|---|---|---|
| 2013/0125199 A1* | 5/2013 | Novak | G06Q 10/04 |
| | | | 726/1 |
| 2014/0207824 A1* | 7/2014 | Brandwine | G06F 21/6209 |
| | | | 707/785 |
| 2014/0208414 A1 | 7/2014 | Brandwine et al. | |
| 2015/0143524 A1* | 5/2015 | Chestna | G06F 21/53 |
| | | | 726/25 |
| 2016/0072814 A1 | 3/2016 | Martinelli | |

OTHER PUBLICATIONS

Hu et al., "Guidelines for Access Control System Evaluation Metrics," National Institute of Standards and Technology (NIST), NISTIR 7874, Sep. 2012, retrieved from http://dx.doi.org/10.6028/NIST.IR.7874, 49 pages.

* cited by examiner

PROVISIONAL COMPUTING RESOURCE POLICY EVALUATION

CROSS REFERENCE TO RELATED APPLICATION

This application is a continuation of U.S. patent application Ser. No. 14/975,204, filed Dec. 18, 2015, entitled "PROVISIONAL COMPUTING RESOURCE POLICY EVALUATION," the disclosure of which is hereby incorporated herein in its entirety.

BACKGROUND

Modern computer systems place a high importance on security of user access to computing resources and on maintaining current and accurate policies for the permissions of computer system users to access those computing resources. Resource owners, and other administrators of resources, often use such computing resource policies to control access by computer system users to computing resources in order to support the business needs of the resource owners, administrators; and users. In a computer system where many users may have several assigned policies associated with and relating to many different computing resources, maintaining user policies can grow increasingly complex, particularly as the size and/or complexity of the system or the number of computer system users increases.

Accordingly, a resource owner may generate new policies to grant users access to resources to perform one or more actions on behalf of the resource owner while simultaneously ensuring the security of resources. However, generating and implementing new policies may be difficult. For instance, if a policy generated by a resource owner replaces an existing policy, there may be unintended consequences that may have an impact on the ability of users to perform the one or more actions on behalf of the resource owner. Further, reverting back to older policies is often difficult and time-intensive.

BRIEF DESCRIPTION OF THE DRAWINGS

Various techniques will be described with reference to the drawings, in which.

DETAILED DESCRIPTION

Figure 1:
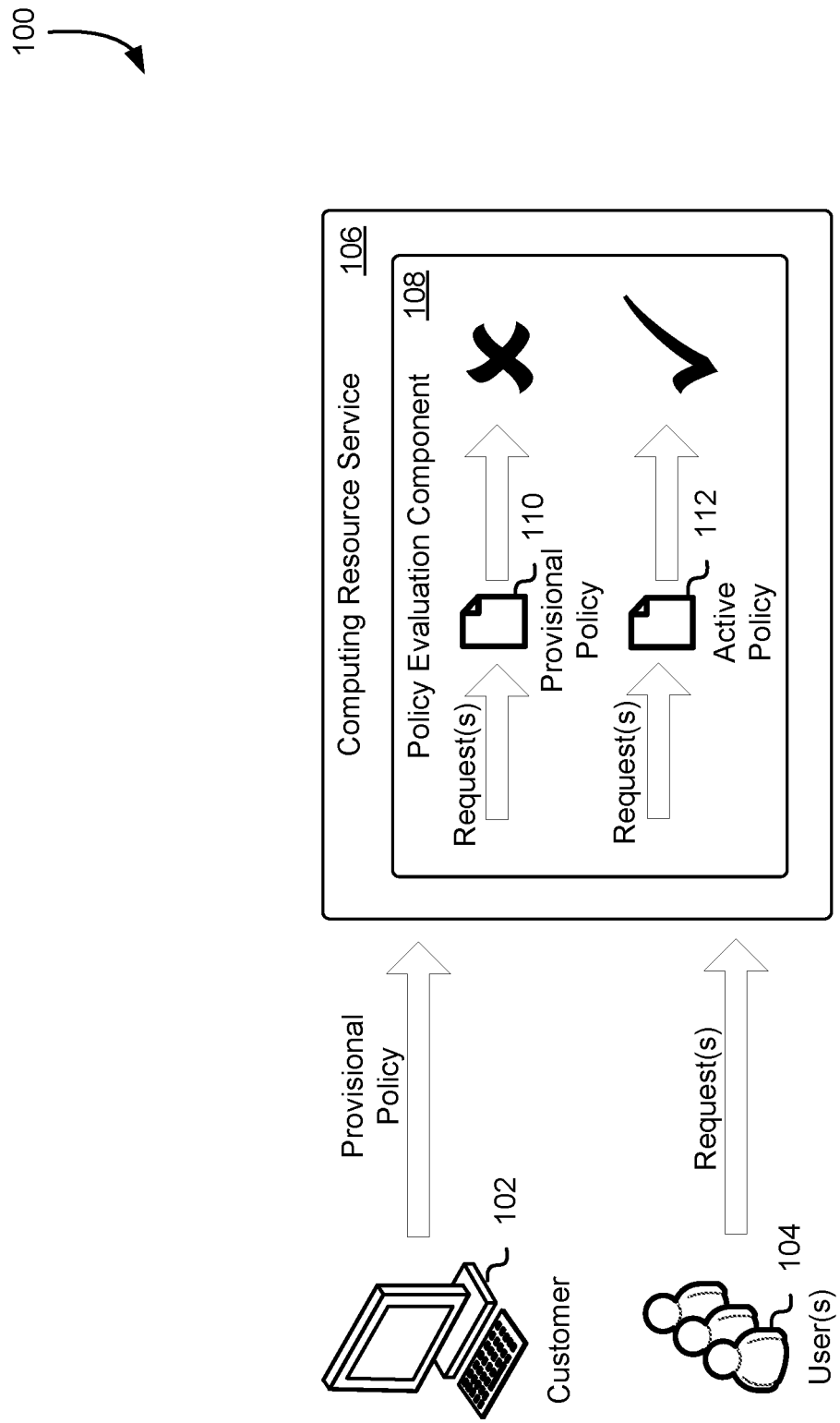
FIG. 1 shows an illustrative example of an environment in which various embodiments can be implemented.

This disclosure relates to the evaluation of provisional policies created by a resource owner for a variety of computing resources to determine whether to implement the provisional policies in place of any existing policies. In one example, a resource owner transmits a provisional policy for a computing resource to a policy management service for evaluation. The resource owner may select, through the policy management service, an active policy that may be in effect for the particular computing resource and that can potentially be replaced by the provisional policy. The policy management service, in response to incoming requests received by a computing resource service and subject to the active policy, may distribute the active policy and the provisional policy to a policy evaluation component of the computing resource service. The policy evaluation component may be configured to evaluate the incoming access requests by processing the access requests using the active policy and the provisional policy obtained from the policy management service. If the policy evaluation component determines that processing the request using the active policy results in an authorization failure, the policy evaluation component may deny the request. However, if the policy evaluation component determines that processing the request using the provisional policy would result in an authorization failure, where an authorization failure would not occur using the active policy, the policy evaluation component may transmit this result to the policy management service. The policy management service may alert the resource owner of any issues associated with the provisional policy, as well as to the user submitting the request in response to its request.

In another example, the policy management service identifies, based on the provisional policy provided by the resource owner, a variety of request logs from the policy evaluation component that can be used to evaluate the provisional policy (e.g., a number of logged requests to which the provisional policy applies). The policy management service may obtain, from the resource owner or from the computing resource service associated with the request logs, authorization context necessary to evaluate the requests specified in the request logs. The policy management service may load the provisional policy into the policy evaluation component of the policy management service and populate the inputs to the component based at least in part on the authorization context obtained from the resource owner or the computing resource service. The policy evaluation component of the policy management service may process the requests from the request log using the provisional policy and the active policy originally used to process the requests to identify any discrepancies between the provisional policy and the active policy. Similar to the process described above, the policy management service may transmit the results of the evaluation of these policies to the resource owner, which may determine whether to implement the provisional policy or not.

The resource owner may also configure an application used to make requests to the computing resource service provider to evaluate a provisional policy. For instance, in an example, the resource owner inputs the provisional policy into the application's software development kit (SDK) for evaluation. As the application submits requests to the computing resource service provider, the SDK may evaluate the provisional policy against the requests it observes and reports to the customer whether the requests being made would be allowed or denied. Based at least in on the evaluation of the provisional policy performed by the SDK of the application, the resource owner may determine whether to persist the provisional policy through the policy management service. If the resource owner submits a request to the policy management service to persist the provisional policy, the policy management service may transmit the provisional policy to the applicable computing resource service to implement the policy.

In this manner, a resource owner can evaluate a provisional policy to determine whether implementation of the provisional policy would have a negative impact on user access to a variety of computing resources. In addition, the techniques described and suggested in this disclosure enable additional technical advantages. For instance, because the policy evaluation component is configured to defer to the active policy in the event of an access discrepancy for a particular request from a user, the provisional policy may not have a negative impact to incoming requests for access to a computing resource. Thus, the active policy may continue to be used while the resource owner evaluates the provisional policy to identify any changes that may be made to the provisional policy to address the issues identified by the policy management service or the policy evaluation component of the computing resource service.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 shows an illustrative example of an environment 100 in which various embodiments can be implemented. In the environment 100, a customer 102 of a computing resource service provider may provide a provisional policy 110 that may be applied to incoming requests from various users 104 for access to a computing resource. The provisional policy 110 is a collection of permissions associated with a user, a group, a role, an organization, a company, or some other such entity. Each permission may be associated with a computing resource and may specify whether the entity (also referred to herein as a "principal") may access that resource, under what conditions access may be allowed or denied, and/or what type of access may be allowed or denied. For example, a permission may specify that a user named "USER1" may access a certain data storage device denoted by identifier "12345," A more detailed permission may specify that USER1 may only read from resource 12345, but may not write to resource 12345. A still more detailed permission may specify that USER1 may read from resource 12345 at any time, but may only write to resource 12345 between the hours of 9:00 and 9:30 AM. Permissions may also be associated with classes or collections of resources so that, for example, USER1 may have access to a collection of data storage devices, one of which may be resource 12345. Principals may include individual users, accounts, computing resource services, or other principal entities that are allowed or denied access to a computing resource.

Computing resource policies, such as the provisional policy 110 and other active policies 112 may be maintained by a policy management service and may be stored in a policy database, which may be a distributed database in a distributed system with multiple nodes that access the policies. The provisional policy 110 may be an updated version of the active policy 112 and may include modified permissions generated based at least in part on original permissions included in the active policy 112. In an embodiment, a customer 102 with privileges for modifying permissions and/or for modifying a set of policies (e.g., an administrator or such other user with privileges for modifying a set of policies, also referred to herein as a "privileged user") of an organization may communicate with the policy management service using one or more application programming interface (API) calls to request creation of policies, editing of policies, or deletion of policies. Such policy modification activities (e.g., creating and editing) may also be referred to herein as "authoring" a policy. The policies may, for example, be utilized to establish, for one or more users 104, a level of access to one or more resources provisioned by or for the organization and, generally, access rights with respect to the one or more resources provisioned by/for the organization. The organization may be a user of a computing resource service provider that utilizes one or more services such as a virtual computer system service, object-based data storage services, database services, a policy management service and configuration and management service as well as a plurality of other services to create and manage resources and to support operational needs.

Computing resource policies, such as the provisional policy 110 and the active policy 112, may be authored in a default state such as, for example, denying all access or granting all access. Computing resource policies may also be authored based on organizational business needs and/or may be based on roles within that organization so that, for example, all software developers have the same computing resource policy. Computing resource policies may also be authored based on the state of a computer system such that, for example, a policy may grant permission to access an enumerated set of resources that existed when the policy was authored. Such authored policies may not be optimal, ideal, or efficient because they may be under-inclusive (i.e., the policy does not include one or more necessary permissions), they may be over-inclusive (i.e., the policy includes one or more unnecessary permissions), they may be overly simple (i.e., with only a few divisions of roles), they may be overly complex (i.e., with separate permissions for each combination of user, resource, and action), or they may be inefficient or sub-optimal for some other reason.

A policy management service may provide access to, and administration of, policies applicable to requests for access to computing resources (e.g., web service application programming interface requests). For example, the policy management service may receive information sufficient for selecting policies applicable to pending requests. In some embodiments, the information may be copies of the requests, or may be information generated based at least in part on the requests). For example, a service such as a service frontend (described herein) may receive a request for access to resources and may generate a query to the policy management service based at least in part on information specified by the request.

In an embodiment, a computing resource service 106, in response to a request from a user 104 to access one or more computing resources provided by the computing resource service 106, obtains a set of policies from the policy management service that may be used to determine whether the user 104 is authorized to access the one or more computing resources. The computing resource service 106 may check whether the fulfillment of the request for access to the service 106 would comply with the obtained policies using a policy evaluation component 108. A policy evaluation component 108 may be a process executing on the service 106 that is operable to compare the request to the one or more permissions in the policies to determine whether service may satisfy the request (i.e., whether fulfillment of the request is authorized). For example, the policy evaluation component 108 may compare an API call associated with the request against permitted API calls specified by the policies to determine if the request is allowed. If the policy evaluation component 108 is not able to match the request to a permission specified by the policies, the policy evaluation component 108 may execute one or more default actions such as, for example, providing a message to the service 106 that causes the service 106 to deny the request, and causing the denied request to be logged in the policy management service. If the authorization matches the request to one or more permissions specified by the policies, the policy evaluation component 108 may resolve this by selecting the least restrictive response (as defined by the policies) and by informing the service 106 whether the fulfillment of the request is authorized (i.e., complies with applicable policies) based on that selected response. The policy evaluation component 108 may also by select the most restrictive response or may select some other such response and inform the service 106 whether the fulfillment of the request is authorized based on that selected response.

The policy evaluation component 108 may check whether the fulfillment of the request for access to the service 106 would comply with the one or more active policies 112 obtained from the policy management service. If the request from the user 104 does not comply with the one or more active policies 112, the policy evaluation component 108 may transmit a message to the computing resource service 106 that causes the computing resource service 106 to deny the user's request to access the computing resource service 106 or otherwise access one or more computing resources maintained by the computing resource service 106. Alternatively, if the request from the user 104 does comply with the one or more active policies 112, the policy evaluation component 108 may transmit a message to the computing resource service 106 that may cause the computing resource service to fulfill the request.

In an embodiment, the policy evaluation component 108 determines whether the obtained policies include one or more provisional policies 110 that are to be evaluated to determine their impact on access for the one or more users 104. The one or more provisional policies 110 may include metadata or other indicators that may be used by the policy evaluation component 108 to identify these policies as provisional policies 110. Further, the metadata for the provisional policies 110 may specify that the provisional policies 110 are inactive and are not to be utilized to determine an authorization decision for incoming requests. The policy evaluation component 108 may similarly check whether fulfillment of the request from the user 104 for access to the service 106 would comply with the one or more provisional policies 110 obtained from the policy management service. However, instead of transmitting a message to the computing resource service 106 based at least in part on an authorization decision generated in response to evaluation of the request, the policy evaluation component 108 may provide an evaluation of the provisional policies 110 to the customer 102 or to the policy management service.

The policy evaluation component 108 may determine whether application of the one or more provisional policies 110 would produce a negative impact on the ability of users 104 to access the computing resource service 106. For instance, if use of an active policy 112 would result in a request from a user 104 to be fulfilled and processing of the same request using the provisional policies 110 would result in the request being denied, the policy evaluation component 108 may transmit an evaluation of the provisional policies 110 to the customer 102 or to the policy management service indicating that application of the provisional policies 110 may result in inconsistent processing of incoming requests or that there are potential unintended consequences that may be present if the provisional policies 110 are enforced. The customer 102 may utilize this information to determine whether to implement the one or more provisional policies 110 or to make any changes to the provisional policies 110 that may be evaluated by the policy evaluation component 108. It should be noted that while the provisional policies 110 are utilized to determine an authorization decision, the policy evaluation component 108 may always defer to the authorization decision generated based at least in part on the one or more active policies 112. Thus, if use of the one or more active policies 112 would result in the request being fulfilled and use of the one or more provisional policies 110 would result in the request being denied, the policy evaluation component 108 may transmit an indication to the computing resource service 106 to fulfill the request.

In some examples, the provisional policies 110 include one or more changes to the permissions originally specified in the one or more active policies 112. For instance, a provisional policy 110 may decrease the permissions originally included in an active policy 112 from which the provisional policy 110 was derived. In some embodiments, the policy management service may determine whether an inconsistent result between use of the active policy 112 and the provisional policy 110 is a result of the decrease in permissions in the provisional policy 110 or of some other unintended consequence resulting from the provisional policy 110 (e.g., typographical errors, erroneous field entries, etc.). Similarly, for a provisional policy 110 that is generated that would increase the permissions originally included in the active policy 112 from which the provisional policy 110 was derived, the policy management service may determine whether the inconsistent result is a result of the increase in permissions or other unintended consequences. In another example, the provisional policy 110 can increase permissions in one dimension but otherwise decrease permissions in another dimension. This may further result in different authorization decisions. The policy management service, through its own policy evaluation component, may identify the nature of the differing authorization decisions and determine, based at least in part on the changes between the active policy 112 and the provisional policy 110 whether the inconsistency is as a result of the change in permissions or some other error present in the provisional policy 110. The policy management service, in its notification to the customer 102 may indicate the nature of the inconsistency, which may enable the customer 102 to either implement the provisional policy 110 and/or address any issues identified with the provisional policy 110.

Figure 2:
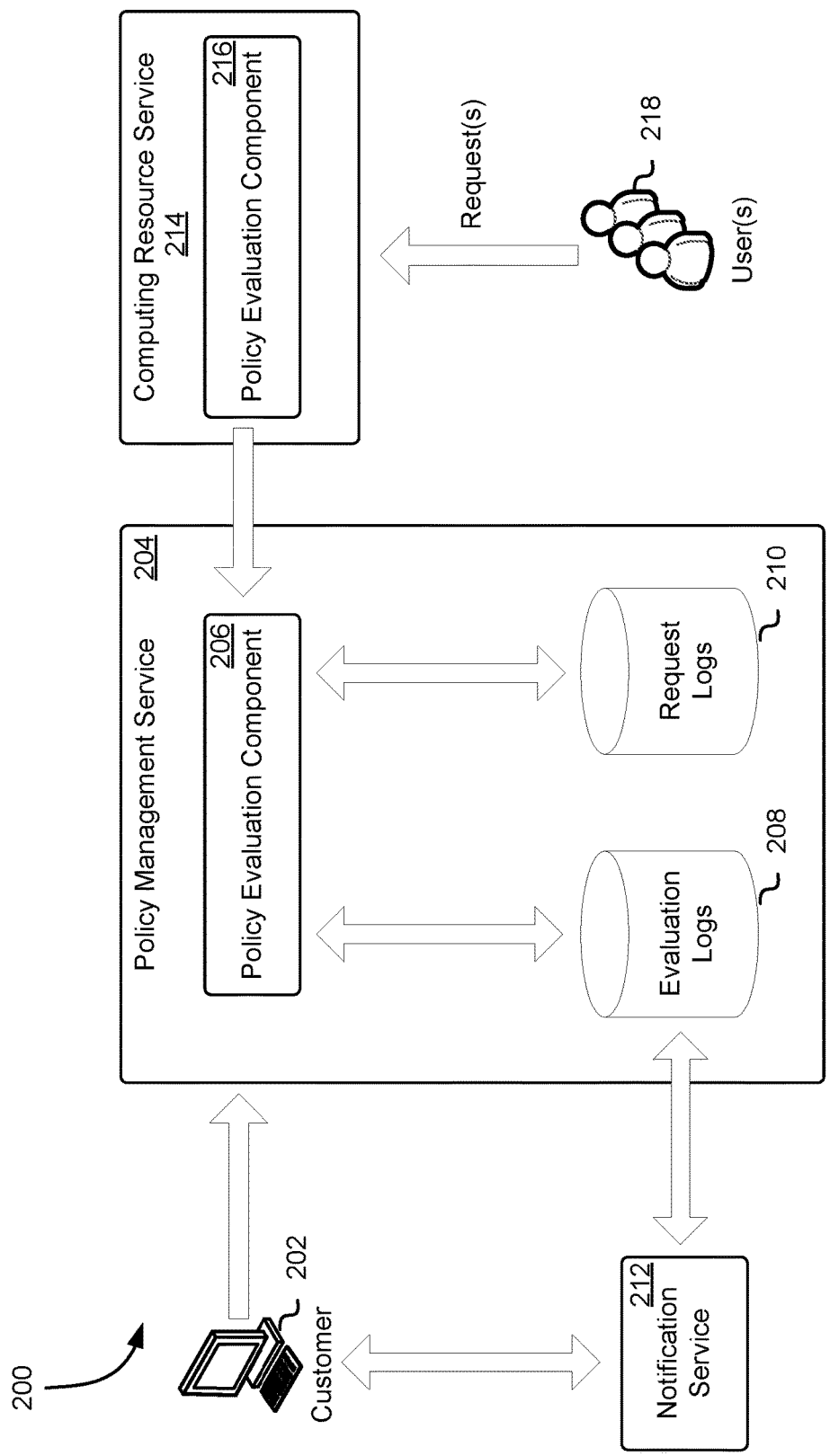
FIG. 2 shows an illustrative example of an environment in which a policy management service, through a policy evaluation component, evaluates provisional policies provided by a customer in accordance with at least one embodiment.

In some embodiments, the policy management service obtains request logs for requests processed by a policy evaluation component of a computing resource service using one or more active policies. In response to obtaining one or more provisional policies from a customer, the policy management service, through use of its own policy evaluation component, may evaluate the previously processed requests using the one or more provisional policies to determine the potential impact of implementing the one or more provisional policies. Accordingly, FIG. 2 shows an illustrative example of an environment 200 in which a policy management service 204, through a policy evaluation component 206, evaluates provisional policies provided by a customer 202 in accordance with at least one embodiment.

In the environment 200, a customer 202 of a computing resource service provider may generate one or more provisional policies that, if implement, may be applicable for one or more computing resources or users 218 of a computing resource service 214. The customer 202 may transmit a request to the policy management service 204 to evaluate the one or more provisional policies to determine the potential impact of implementing the one or more provisional policies in place of, or in addition to, one or more active policies. The request may include the one or more provisional policies and authorization context that may be used to provide the inputs necessary to process the previously processed requests using the one or more provisional policies. For instance, the authorization context may identify the principal, computing resource, actions that may be performed, any conditions on performance of the one or more actions, and the effect of the policy.

The policy evaluation component 206 of the policy management service 204 may obtain one or more request logs from the computing resource service 214 as requests from various users 218 are processed by the policy evaluation component 216 of the computing resource service 214. The policy evaluation component 206 of the policy management service 204 may store the request logs from the computing resource service 214 in a request logs datastore 210. The request logs datastore 210 may comprise one or more computer systems and storage devices configured to store request logs from various computing resource services that may obtain one or more computing resource policies from the policy management service 204. The request logs may specify the requests processed by the associated computing resource service 214 over time and may identify other features that may be used by the policy evaluation component 206 to evaluate the provisional policies from the customer 202. For instance, for each request specified in the request logs datastore 210, the request logs datastore 210 may specify the principal (e.g., user 218) associated with the request, the computing resources targeted by the request, the requested actions to be performed, and the like.

In response to obtaining the one or more provisional policies from the customer 202, the policy evaluation component 206 of the policy management service 204 may access the request logs datastore 210 to obtain one or more previously processed requests that would be subject to the one or more provisional policies if the one or more provisional policies were to be implemented. The policy evaluation component 206 may utilize the authorization context provided by the customer 202 to identify the one or more requests from the request logs datastore 210. Further, the policy evaluation component 206 may utilize the authorization context as input into the one or more provisional policies to make the one or more provisional policies applicable to the previously processed requests.

The policy evaluation component 206 of the policy management service 204 may check whether the fulfillment of the previously processed request for access to the computing resource service 214 would comply with the one or more provisional policies obtained from the customer 202. For instance, the policy evaluation component 206 of the policy management service 204 may determine whether the previously processed request would be fulfilled or denied if the one or more provisional policies were applied to the requests by the computing resource service 214. Based at least in part on this determination, the policy evaluation component 206 of the policy management service 204 may determine whether the effect of using the one or more provisional policies is consistent with that of the currently active policies used to process the requests and to determine whether there are any unintentional consequences of using the provisional policies. For instance, if implementation of the one or more provisional policies would result in a request being denied, whereas the use of one or more active policies would result in the request being fulfilled, the policy evaluation component 206 may determine that the one or more provisional policies would have a negative impact if implemented.

The policy evaluation component 206 of the policy management service 204 may maintain statistical data based at least in part on the processing of the previously processed requests using the one or more provisional policies to qualify any negative impact that may result through implementation of the one or more provisional policies. For instance, the policy evaluation component 206 of the policy management service 204 may generate an evaluation log that specifies the percentage of previously processed requests that would result in a different outcome if processed using the provisional policies, the types of requests that are impacted by use of the provisional policies, the users that may be impacted if the provisional policies are implemented, and the like. The policy evaluation component 206 of the policy management service 204 may store the evaluation log in an evaluation log datastore 208. The evaluation log datastore 208 may comprise one or more computer systems and storage devices configured to store evaluation logs generated by the policy evaluation component 206.

In an embodiment, the policy management service 204 transmits evaluation logs from the evaluation logs datastore 208 to one or more notification services 212 for delivery to the customer 202 and any other recipients subscribed to at least one notification service 212 for obtaining evaluation logs. The one or more notification services 212 may enable the policy management service 204 to send notifications to large numbers of recipients or other distributed networks and receive notifications through a communications network. A customer 202 may utilize an interface, provided by the computing resource service provider, to create or subscribe to one or more subjects to which one or more messages may be published through. For instance, a customer 202 may use the interface to create a new subject and subscribe to this subject by specifying that any messages published to the subject may be transmitted to a particular location (e.g., electronic mail address, one or more servers, an existing queue within the managed queuing service, etc.). Accordingly, when the policy management service 204 publishes a message to the subject, the message may be transmitted to each recipient subscribed to the subject. The policy management service 204 may add the evaluation log from the evaluation logs datastore 208 to this subject, which may cause the one or more notification services 212 to transmit the evaluation log to the customer 202 and other recipients which may be subscribed to this particular subject.

The customer 202, based at least in part on the obtained evaluation logs, may determine whether to implement the one or more provisional policies. For instance, the customer 202 may transmit a request to the policy management service 204 to make the one or more provisional policies active such that, in response to a request from the computing resource service 214 to obtain one or more policies that may be applicable to the request, the policy management service 204 may provide the provisional policies to the computing resource service 214. In some embodiments, if the policy management service 204 determines, based at least in part on the evaluation of the provisional policies performed by the policy evaluation component 206, that the implementation of the provisional policies may not result in a negative impact to incoming requests, the policy management service 204 may make the provisional policies available to the computing resource service 214. This may enable the computing resource service 214 to obtain the provisional policies and apply these provisional policies to any applicable incoming requests to determine whether to fulfill or deny the incoming requests.

Figure 3:
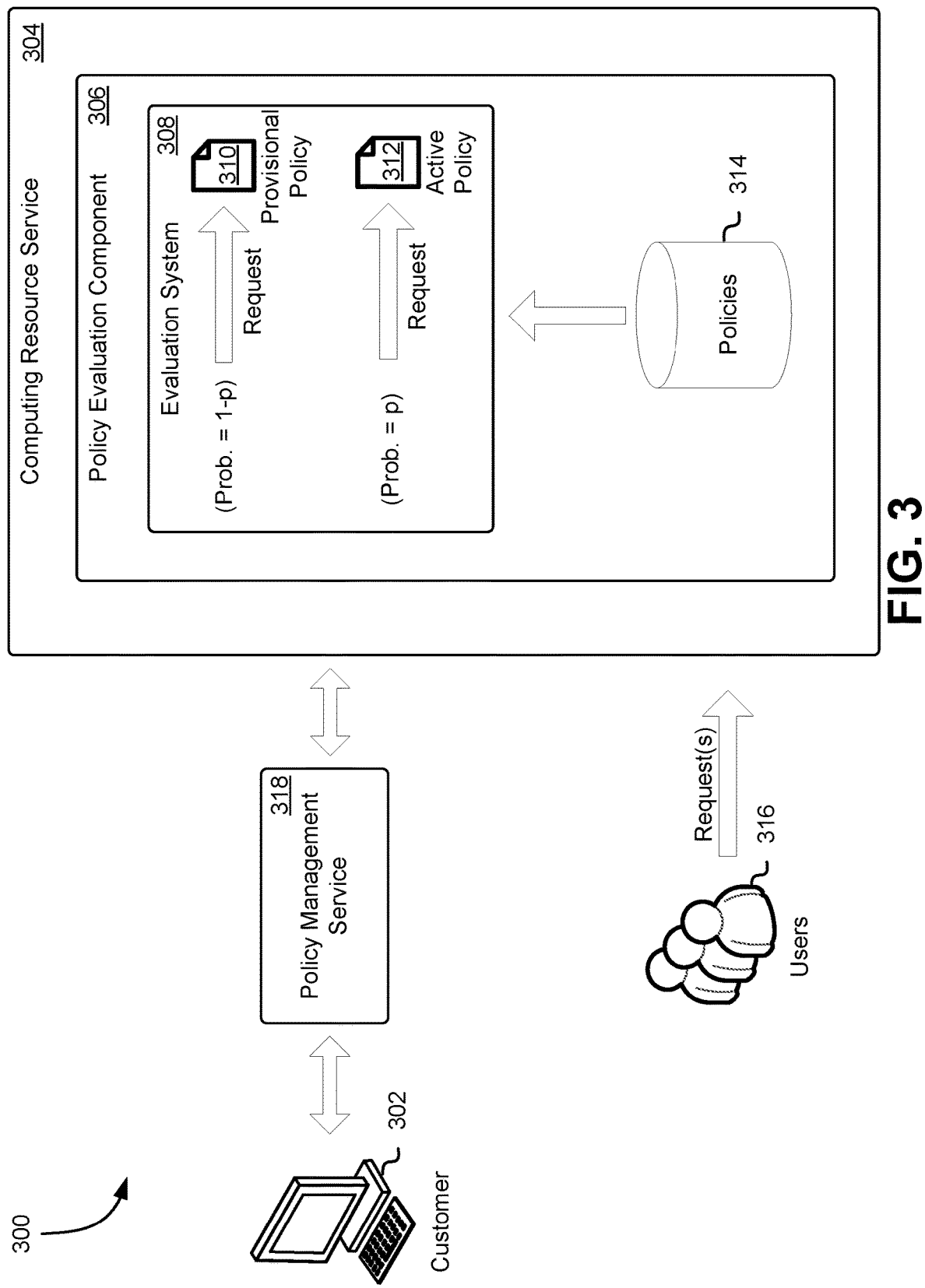
FIG. 3 shows an illustrative example of an environment in which a policy evaluation component of a computing resource service applies a probability for application of a provisional policy to determine the impact of the provisional policy in accordance with at least one embodiment.

In an embodiment, the policy management service may make the one or more provisional policies available to the computing resource services subject to a probability for their use. For instance, the policy management service may transmit configuration information to a policy evaluation component of the computing resource service that may cause the policy evaluation component to utilize the provisional policy based at least in part on the probability specified by the policy management service. The policy management service may evaluate the results of application of the provisional policies to determine the impact of the provisional policy and whether to increase the probability for use of the provisional policy. Accordingly, FIG. 3 shows an illustrative example of an environment 300 in which a policy evaluation component 306 of a computing resource service 304 applies a probability for application of a provisional policy 310 to determine the impact of the provisional policy 310 in accordance with at least one embodiment.

In the environment 300, a customer 302 may provide one or more provisional policies 310 to a policy management service 318 for evaluation and potential implementation. The policy management service 318 may evaluate the implementation of the provisional policies 310 by determining a probability for application of the provisional policies 310 to incoming requests from users 316 of a computing resource service 304. Thus, in response to a request from the computing resource service 304 to obtain a set of policies usable to determine whether a user request to access the computing resource service 304 is to be fulfilled or not, the policy management service 318 may provide any active policies 312, as well as the provided provisional policies 310, to the computing resource service 304. Additionally, the policy management service 318 may transmit configuration information that may specify the probability for application of the provisional policy 310 to incoming user requests for access to the computing resource service 304. The probability for application of the provisional policy 310 may be expressed as a weighting factor that may be used by the policy evaluation component 306 to probabilistically select either the provisional policy 310 or the active policy 312. For instance, the weighting factor may be used to determine a sub-range of numerical values from a range of numerical values that may be assigned to the provisional policy 310. Through use of a random number generator that selects numerical values within the range of numerical values, the policy evaluation component 306 may select a numerical value that may be used to determine whether to select the provisional policy 310 or the active policy 312.

In some embodiments, the customer 302 can specify different probabilities for application of the provisional policy 310 for different data regions. For instance, the computing resource service 304 may be hosted in multiple locations worldwide in order to support a variety of customers that may want to operate these services from varied locations. Each location may comprise a number of data regions and one or more data zones. A data zone may be an independent section of a data center that may add redundancy and fault tolerance to a particular location. Each data region may comprise one or more partitions of the data zones which may be used to further allocate resources to the customers utilizing one or more services provided by the computing resource service provider. The customer 302 may thus specify a different probability for application of the provisional policy 310 for each data region that may include the computing resource service 304.

The computing resource service 304 may include a policies cache 314, which may be used to store any policies obtained from the policy management service 318 in response to user requests. For instance, the computing resource service 304 may cache any incoming policies from the policy management service 318 for a configured period of time to enable the computing resource service 304 to obtain the cached policies from the policies cache 314 without need to request the policies from the policy management service 318. The policies cache 314 may comprise one or more storage devices of the policy evaluation component 306 that may be used to temporarily store any policies obtained from the policy management service 316 in response to a user request. Thus, the policies cache 314 may be used to store the provisional policies 310 and the active policies 312 obtained from the policy management service 318.

In response to a request from a user 316 to access the computing resource service 304 or otherwise perform one or more operations on a computing resource managed by the computing resource service 304, the policy evaluation component 306, through an evaluation system 308, may determine whether the provisional policies 310 or the active policies 312 are to be utilized to determine whether to fulfill the incoming request. For instance, the evaluation system 308 may utilize a random number generator configured to generate random numbers based at least in part on the determined probability for implementation of the provisional policies 310 to select a number. If the number corresponds to a number assigned to the implementation of the provisional policies 310, the policy evaluation component 306 may process the incoming request using the provisional policies 310. However, if any other number is generated, the policy evaluation component 306 may process the incoming request using the active policies 312. It should be noted that while random number generators are used extensively throughout the present disclosure for selection of the policies subject to the determined probability, other mechanisms and techniques may be used to select the provisional policies 310 subject to the determined probability.

As the policy evaluation component 306 processes incoming requests from various users 316 of the computing resource service 304, the policy evaluation component 306 may transmit results of the application of the provisional policies 310 to the policy management service 318 for evaluation. The policy management service 318 may determine, based at least in part on the processing of incoming requests using the provisional policies 310 and the active policies 312 by the policy evaluation component 306, whether use of the provisional policies 310 results in an error rate that exceeds a maximum threshold. For instance, the policy management service 318 may determine an acceptable percentage rate of inconsistent or otherwise erroneous results from processing incoming requests using the provisional policies 310. If the error rate for the application of the provisional policies 310 to incoming requests exceeds the acceptable percentage rate, the policy management service 318 may deactivate the provisional policy and notify the customer 302 of the issues identified regarding the one or more provisional policies 310. In some embodiments, the policy management service 318 can reduce the probability of selection of the provisional policies 310 and continue evaluation of the use of these provisional policies 310 to determine the potential impact of implementation.

If the error rate has not been exceeded, the policy management service 318 may increase the probability for selection of the provisional policies 310. The policy management service 318 may generate new configuration information that may be transmitted to the policy evaluation component 306. This new configuration information may cause the policy evaluation component 306 to update the evaluation system 308 and the random number generator in accordance with the newly identified probability provided by the policy management service 318. Thus, in response to incoming requests from users 316 of the computing resource service 304, the evaluation system 308 may be more likely to select the provisional policies 310 for evaluation of the incoming requests. The policy evaluation component 306 of the computing resource service 304 may transmit the results of the application of the provisional policies 310 to the policy management service 318 for evaluation. If the results still do not exceed the error rate threshold for the provisional policies 310, the policy management service 318 may continue to increase the probability that the provisional policies 310 until either the error rate threshold is exceeded or the provisional policies 310 supersede the active policies 312 (e.g., probability of using the provisional policies 310 is 100%). If, at any time, the error rate threshold is exceeded, the policy management service 318 may deactivate the provisional policies 310 and notify the customer 302 of any issued identified in using the provisional policies 310 to process incoming user requests.

Figure 4:
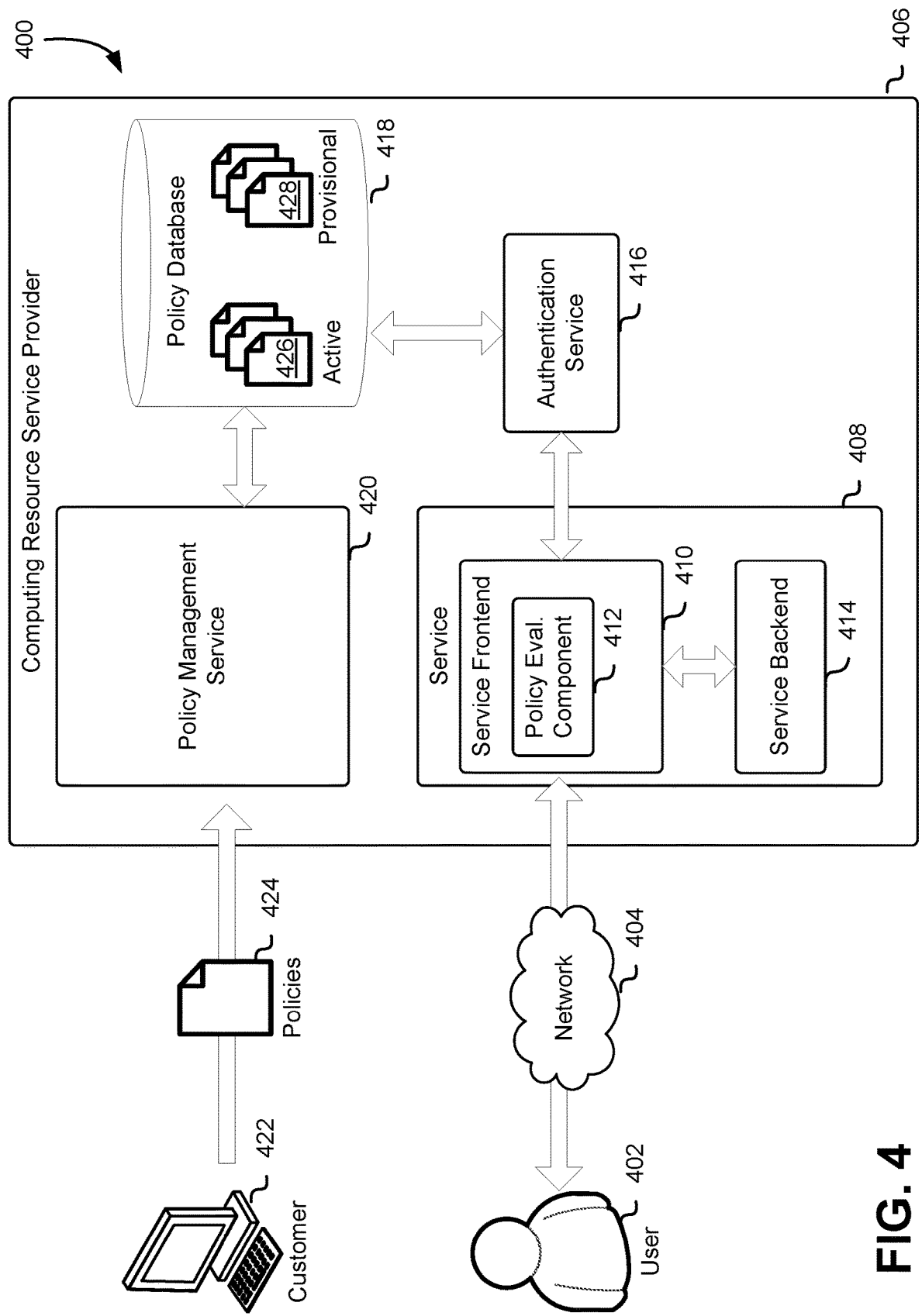
FIG. 4 shows an illustrative example of an environment in which computing resource policies may be managed in accordance with at least one embodiment.

FIG. 4 shows an illustrative example of an environment 400 in which computing resource policies may be managed in accordance with at least one embodiment. In an embodiment, a user 402 may use a computing device to communicate over a network 404 with a computing resource service provider 406. Communications between the computing resource service provider 406 and the user 402 may, for instance, be for the purpose of accessing a service 408 operated by the computing resource service provider 406, which may be one of many services operated by the computing resource service provider 406. The service 408 may comprise a service frontend 410 and a service backend 414. The user 402 may issue a request for access to a service 408 (and/or a request for access to resources associated with the service 408) provided by a computing resource service provider 406. The request may be, for instance, a web service application programming interface request. The user may be an individual, or a group of individuals, or a role associated with a group of individuals, or a process representing one or more of these entities that may be running on one or more remote (relative to the computing resource service provider 406) computer systems, or may be some other such computer system entity, individual, or process. Each individual, group, role, or other such collection of users may have a corresponding user definition, group definition, role definition, or other definition that defines the attributes and/or membership of that collection. For example, a group may be a group of users that have the same geographical location. The definition of that group of users may include the membership of the group, the location, and other data and/or metadata associated with that group. As used herein, a user is an entity corresponding to an identity managed by the computing resource service provider, where the computing resource service provider manages permissions for the identity and where the entity may include one or more sub-entities, which themselves may have identities.

The user 402 may communicate with the computing resource service provider 406 via one or more connections (e.g., transmission control protocol (TCP) connections). The principal 402 may use a computer system client device to connect to the computing resource service provider 406. The client device may include any device that is capable of connecting with a computer system via a network, such as example devices discussed below. The network 404 may include, for example, the Internet or another network or combination of networks discussed below.

The computing resource service provider 406, through the service 408, may provide access to one or more computing resources such as virtual machine (VM) instances, automatic scaling groups, file-based database storage systems, block storage services, redundant data storage services, data archive services, data warehousing services, user access management services, identity management services, content management services, and/or other such computer system services. Other example resources include, but are not limited to user resources, policy resources, network resources and/or storage resources. In some examples, the resources associated with the computer services may be physical devices, virtual devices, combinations of physical and/or virtual devices, or other such device embodiments.

The request for access to the service 408 may be received by a service frontend 410, which, in some examples, comprises a web server configured to receive such requests and to process them according to one or more policies associated with the service 408. The request for access to the service 408 may be a digitally signed request and, as a result, may be provided with a digital signature. The service frontend 410 may then send the request and the digital signature for verification to an authentication service 416. The authentication service 416 may be a stand-alone service or may be part of a service provider or other entity. The authentication service 416, in an embodiment, is a computer system configured to perform operations involved in authentication of users. In some examples, requests submitted to the service frontend 410 are digitally signed by the user 402 (i.e., by a computing device used by or operating on behalf of the principal) using a symmetric cryptographic key that is shared between the user 402 and the authentication service 416. The authentication service, therefore, may use a copy of the symmetric cryptographic key to verify digital signatures of requests purported to have been generated by the user 402. However, in other embodiments, the authentication service 416 can be configured to utilize asymmetric cryptography for digital signature verification such as, for example, in response to the principal digitally signing requests using a private cryptographic key. In such embodiments, the authentication service may be configured to trust a certificate authority that digitally signed a certificate of the user 402 corresponding to the private cryptographic key. Consequently, in some embodiments, the authentication service may use a public cryptographic key specified by the certificate.

If the request is successfully authenticated, the authentication service 416 may then obtain policies applicable to the request. A policy may be applicable to the request by way of being associated with the user 402, a resource to be accessed as part of fulfillment of the request, a group in which the user 402 is a member, a role the user 402 has assumed, and/or otherwise. To obtain policies applicable to the request, the authentication service 416 may transmit a query to a policy database 418 managed by a policy management service 420, which may be the policy management service discussed above in connection with FIGS. 2 and 3. The policy management service 420 may also determine the policy version associated with the policy by transmitting a query to the policy database 418.

In an embodiment, a customer 422 of the computing resource service provider 406 transmits one or more policies 424 that may be implemented by the policy management service 420 and stored within the policy database 418 to make the policies available to the authentication service 416. The customer 422 may provide, to the policy management service 420, a set of active policies 426 that are to be implemented and/or a set of provisional policies 428 that may be evaluated by the policy management service 420 to determine the potential impact of implementation of the set of provisional policies 428 to applicable requests. The policy management service 420 may update the policy database 418 to include the active policies 426 and the provisional policies 428 provided by the customer 422 to make these policies available to the authentication service 416 for processing of incoming requests. In some embodiments, the policy management service 420 can also store configuration information for the policy evaluation component 412 of the service frontend 410 such that the policy evaluation component 412 may evaluate the incoming requests using the provisional policies 428 subject to a probability of use for the provisional policies 428 specified in the configuration information. In another embodiment, the authentication service 416 obtains the active policies 426 and the provisional policies 428 that may be applicable to the incoming request and causes the policy evaluation component 412 to utilize the active policies 426 to determine whether to fulfill the incoming request and to utilize the provisional policies 428 to determine the potential impact of using the provisional policies 428 without using the provisional policies 428 to generate an authorization decision.

The query to the policy database 418 may be a request comprising information sufficient to determine a set of policies applicable to the request and the associated version for each policy of this set of policies. The query to the policy database 418 may, for instance, contain a copy of the request and/or contain parameters based at least in part on information in the request, such as information identifying the user, the resource, and/or an action (operation to be performed as part of fulfillment of the request). The policy database 418 may be a database or other system operable to process queries. The policy database 418 may process queries by providing records and/or other such data applicable to the request and/or responsive to the queries. Note that, if authentication of the request is unsuccessful (e.g., because a digital signature could not be verified), policies applicable to the request and/or usage data associated with the policy may not be provided to the requester.

Having obtained any policies (e.g., active policies 426 and provisional policies 428) applicable to the request, the authentication service 416 may provide an authentication response and, if applicable, the obtained policies back to the service frontend 410. The authentication response may indicate whether the response was successfully authenticated. The service frontend 410 may then check whether the fulfillment of the request for access to the service 408 would comply with the obtained policies using a policy evaluation component 412, as described above. A policy evaluation component 412 may be a process executing on the service frontend that is operable to compare the request to the one or more permissions in the policy to determine whether service may satisfy the request (i.e., whether fulfillment of the request is authorized). For example, the policy evaluation component may compare an API call associated with the request against permitted API calls specified by the policy to determine if the request is allowed. If the policy evaluation component 412 is not able to match the request to a permission specified by the policy, the policy evaluation component 412 may execute one or more default actions such as, for example, providing a message to the service frontend that causes the service frontend to deny the request, and causing the denied request to be logged in the policy management service 420. If the authorization matches the request to one or more permissions specified by the policy, the policy evaluation component 412 may resolve this by selecting the least restrictive response (as defined by the policy) and by informing the service frontend whether the fulfillment of the request is authorized (i.e., complies with applicable policy) based on that selected response. The policy evaluation component 412 may also select the most restrictive response or may select some other such response and inform the service frontend whether the fulfillment of the request is authorized based on that selected response. Note that, while FIG. 4 shows the policy evaluation component 412 as a component of the service frontend 410, in some embodiments, the policy evaluation component 412 is a separate service provided by the computing resource service provider 406 and the frontend service may communicate with the authorization module 412 over a network.

If the fulfillment of the request for access to the service 408 complies with the applicable obtained policies, the service frontend 410 may fulfill the request using the service backend 414. A service backend 414 may be a component of the service configured to receive authorized requests from the service frontend 410 and configured to fulfill such requests. The service frontend 410 may, for instance, submit a request to the service backend to cause the service backend 414 to perform one or more operations involved in fulfilling the request. In some examples, the service backend 414 provides data back to the service frontend 410 that the service frontend provides in response to the request from the user 402. In some embodiments, a response to the user 402 may be provided from the service frontend 410 indicating whether the request was allowed or denied and, if allowed, one or more results of the request.

In an embodiment, if the policy evaluation component utilizes any provisional policies 428 obtained from the policy database 418 to evaluate the impact of using the provisional policies 428, the policy evaluation component 412 can generate one or more evaluation logs that may include an indication of the impact of using the provisional policies 428. For instance, the policy evaluation component 412 may specify a percentage of requests from users 402 that would have resulted in erroneous or otherwise inconsistent results if the provisional policies 428 were to be implemented. These evaluation logs may be transmitted by the policy evaluation component 412 to the policy management service 420, which may further evaluate the evaluation logs from the policy evaluation component 412 and transmit a notification to the customer 422 indicating the results of the evaluation of the provisional policies 428. The customer 422 may utilize this information to modify the provisional policies 428 and perform additional analyses of these provisional policies 418. Alternatively, the customer 422 may transmit a request to the policy management service 420 to implement the one or more provisional policies 428. This may cause the policy management service 420 to update the policy database 418 to make the provisional policies 428 active. Thus, the authentication service 416 may obtain these policies from the policy database 418 and cause the policy evaluation component 412 to utilize the newly implemented policies to evaluate incoming user requests.

It should be noted that in some alternative embodiments, the computing resource service provider 406 does not require an authentication service 416 to enable transmission of policies from the policy database 418 to the service frontend 410 and the policy evaluation component 412. For instance, the policy evaluation component 412 may generate the query to the policy database 418 comprising information sufficient to determine a set of policies applicable to the request from the user 402 and the associated version for each policy of this set of policies. In response to the query, the policy database 418 may provide the requisite active policies 426 and the provisional policies 428 that may be applied to the request. In another example, the policy evaluation component 412 transmits a request to the policy management service 420 to obtain the set of policies applicable to the request from the user 402. This may cause the policy management service 420 to query the policy database 418 to obtain the one or more policies and to provide these one or more policies to the policy evaluation component 412.

Figure 5:
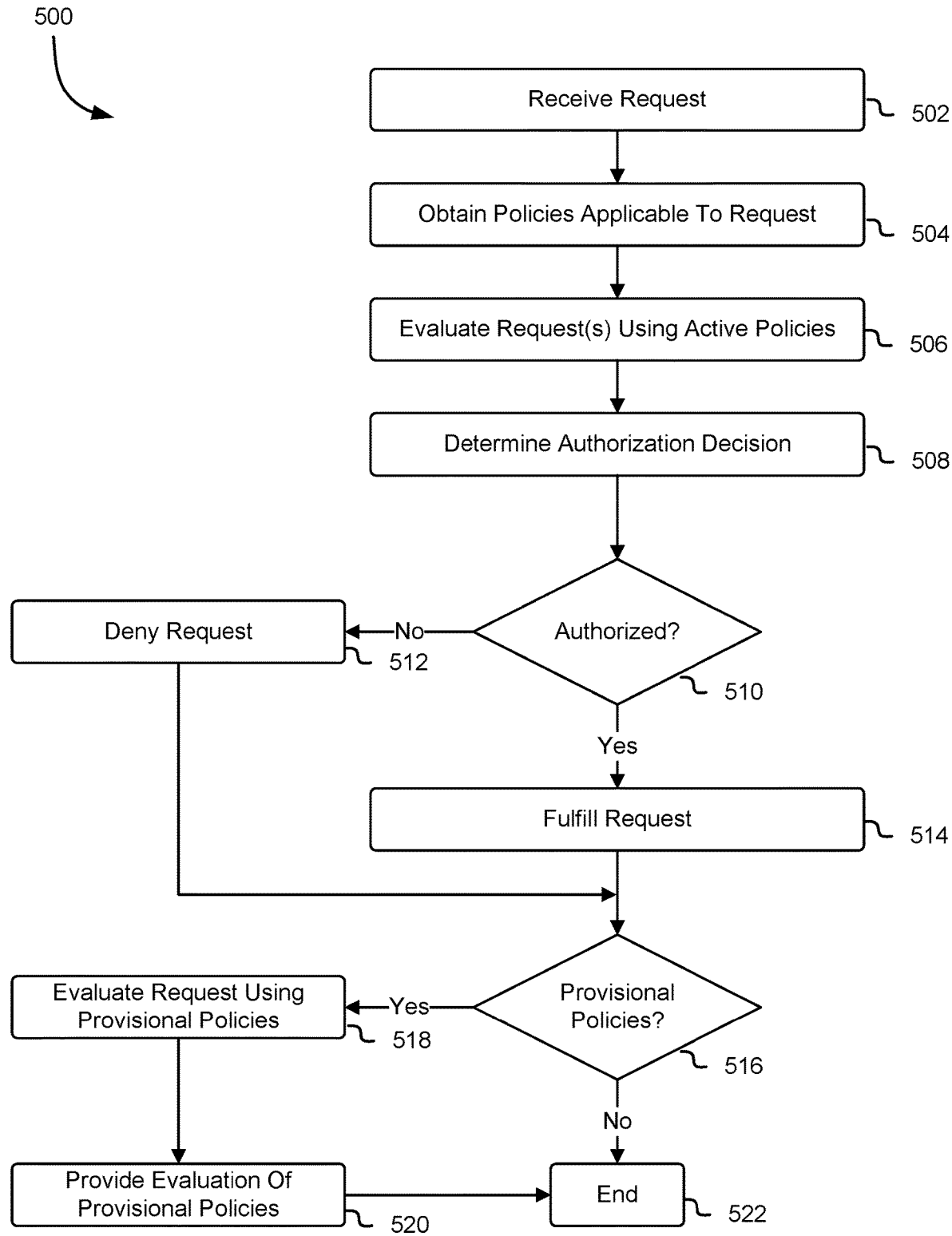
FIG. 5 shows an illustrative example of a process for evaluating requests using active and provisional policies to determine the impact of the provisional policies in accordance with at least one embodiment.

As noted above, a computing resource service may evaluate incoming requests against one or more policies to determine whether the incoming requests are to be fulfilled or denied. In an embodiment, the computing resource service may receive, from an authentication service, a set of active policies that may be used to evaluate the incoming requests and a set of provisional policies that may be evaluated to determine the potential impact of implementing the provisional policies. Accordingly, FIG. 5 shows an illustrative example of a process 500 for evaluating requests using active and provisional policies to determine the impact of the provisional policies in accordance with at least one embodiment. The process 500 may be performed by a computing resource service, which may be configured to process incoming user requests to access the computing resource service and/or to access one or more computing resources maintained by the computing resource service. The computing resource service may include a policy evaluation component that may be configured to evaluate the incoming requests against the active policies and any provisional policies to determine the potential impact of implementing the provisional policies.

At any time, the computing resource service may receive 502 a request from a user of the computing resource service to access the computing resource service or otherwise access one or more computing resources maintained by the computing resource service. The request for access to the service may be received by a service frontend, which may process the request according to one or more policies associated with the service. The request for access to the service may be a digitally signed request and, as a result, may be provided with a digital signature. The service frontend may send the request and the digital signature for verification to an authentication service. If the request is successfully authenticated, the authentication service may obtain a set of policies applicable to the request. The set of policies may include any active policies that may be used to evaluate the request and any provisional policies that are to be evaluated on behalf of a customer of the policy management service. The authentication service may provide this set of policies to the computing resource service. Thus, the computing resource service may obtain 504 the set of policies that are to be utilized to process the incoming request and, in some instances, to determine the potential impact of implementation of one or more provisional policies, if included in the set of policies.

The computing resource service, through a policy evaluation component, may evaluate 506 the received request using any active computing resource policies obtained from the authentication service. For example, the policy evaluation component may compare an API call associated with the request against permitted API calls specified by the obtained policies to determine if the request is allowed. If the policy evaluation component is not able to match the request to a permission specified by the policy, the policy evaluation component may execute one or more default actions such as, for example, providing a message to the service frontend that may cause the service frontend to deny the request, and causing the denied request to be logged in the policy management service. If the authorization matches the request to one or more permissions specified by the policy, the policy evaluation component may resolve this by selecting the least restrictive response (as defined by policy) and by informing the service frontend whether the fulfillment of the request is authorized based on that selected response. The policy evaluation component may also select the most restrictive response or may select some other such response and inform the service frontend whether the fulfillment of the request is authorized based on that selected response. Thus, based at least in part on the evaluation of the received request using the active policies, the policy evaluation component may determine 508 an authorization decision for the request.

Based at least in part on the authorization decision determined by the policy evaluation component, the computing resource service may determine 510 whether the user is authorized to perform the requested actions. For instance, if the computing resource service determines, based at least in part on an evaluation of the request using the active policies, that the user is not authorized to perform the requested actions, the computing resource service may deny 512 the request and log the denied request in the policy management service. However, if the computing resource service determines that the user is authorized to perform the requested actions, the computing resource service may fulfill 514 the request according to the permissions set forth in the active policies obtained from the authentication service.

The computing resource service may further determine 516 whether the obtained policies include one or more provisional policies that are to be evaluated against the incoming requests to determine the potential impact of implementing the one or more provisional policies. If the obtained policies include one or more provisional policies, the computing resource service may cause the policy evaluation component to evaluate 518 the received request using the one or more provisional policies to determine whether the received request would be denied or fulfilled if the one or more provisional policies were to be implemented. For instance, the policy evaluation component may log any instance wherein application of the provisional policies would result in an inconsistent outcome if compared with the outcome generated based at least in part on application of the one or more active policies. Alternatively, the policy evaluation component may log all results of the evaluation of the incoming requests using the provisional policies.

In an embodiment, a customer can specify a rate at which the provisional policies are to be evaluated for incoming requests to the computing resource service. For instance, a customer may specify that a provisional policy is to be evaluated against a fraction of all incoming requests to obtain evaluation results for the provisional policy. Thus, in some instances, the computing resource service determines whether the one or more provisional policies obtained from the policy database are to be evaluated for the present request. The determination as to whether the computing resource service is to evaluate the one or more provisional policies may be made by the policy management service through configuration of the policy database or by the computing resource service itself, which may utilize a probabilistic determination or other mechanism (e.g., counters, provisional policy processing rate, etc.) to determine whether to evaluate the one or more provisional policies.

The policy evaluation component may provide 520 its evaluation of the provisional policies to the policy management service. This may cause the policy management service to determine the potential impact of implementing the provisional policies and to transmit its determination to the customer. The customer may utilize this information to modify the provisional policies based at least in part on the identified issues associated with implementation of the provisional policies. Alternatively, if no issues were identified, the customer may submit a request to the policy management service to implement the provisional policies. If the obtained policies do not include any provisional policies or the policy evaluation component has provided the evaluation of the provisional policies to the policy management service, the computing resource service may end 522 the process 500 and await further user requests.

Figure 6:
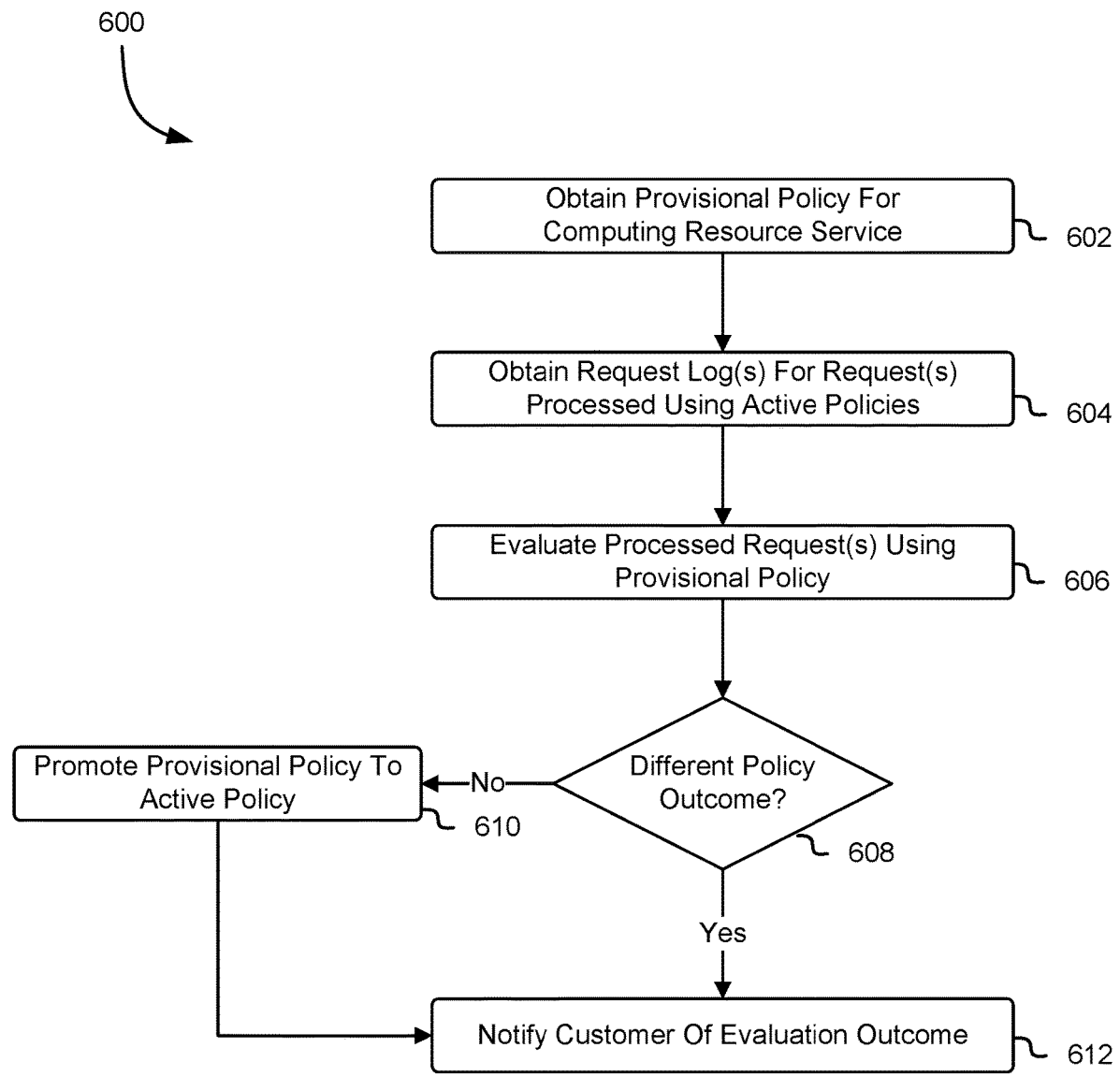
FIG. 6 shows an illustrative example of a process for evaluating previously processed requests using provided provisional policies to determine the impact of the provisional policies in accordance with at least one embodiment.

As noted above, the policy management service may obtain one or more request logs from a computing resource service and utilize these request logs to evaluate a set of provisional policies to identify the potential impact of implementing the set of provisional policies. The policy management service may include its own policy evaluation component that may obtain the authorization context for the previously processed requests and utilize this information to populate the provisional policies for evaluation. The policy evaluation component may thus utilize the provisional policies, along with the previous processed requests, to determine the potential impact of implementing the provisional policies. Accordingly, FIG. 6 shows an illustrative example of a process 600 for evaluating previously processed requests using provided provisional policies to determine the impact of the provisional policies in accordance with at least one embodiment. The process 600 may be performed by the aforementioned policy management service in coordination with the policy evaluation component.

At any time, the policy management service may receive a request from a customer to evaluate one or more provisional policies. The one or more provisional policies may include a set of permissions that may differ from those present in any active policies used to control access to one or more computing resources. For instance, the one or more provisional policies may specify different conditions for a permission associated with a particular computing resource. Alternatively, the one or more provisional policies may identify different roles that are to be associated with the permissions included in the one or more provisional policies. From the request, the policy management service may obtain 602 the one or more provisional policies that may be used for a particular computing resource service and its computing resources. In addition, the policy management service may obtain, from the customer, authorization context that may be used to populate the one or more provisional policies such that the one or more provisional policies may be evaluated against previously processed requests.

Based at least in part on the obtained provisional policies and the authorization context specified by the customer, the policy management service may obtain 604 one or more request logs for requests processed using one or more active policies that would otherwise be superseded by the provisional policies if implemented. In an embodiment, the computing resource service records one or more request logs as requests are processed using active policies by the policy evaluation component of the computing resource service. The policy evaluation component may transmit these request logs to the policy management service, which may store these request logs in a request logs datastore for reference. Thus, the policy management service may obtain these request logs directly from the policy evaluation component of the computing resource service or from the request logs datastore. It should be noted that the request logs may further include the authorization context necessary to utilize the provisional policies provided by the customer. Thus, if the customer does not provide the authorization context or provides partial information necessary to populate the provisional policies, the policy management service may obtain any, needed information from these request logs.

The policy management service, through the policy evaluation component of the policy management service, may evaluate the various processed requests specified in the request logs against the provided provisional policies. For instance, the policy evaluation component may generate one or more pseudo-requests that are similar to the processed requests. The policy evaluation component may select the one or more provisional policies and process the pseudo-requests using the provisional policies to determine the authorization decisions for each of these pseudo-requests. The policy evaluation component may log these authorization decisions, which the policy evaluation component may compare with the actual authorization decisions generated based at least in part on application of active policies against the received requests. Through this comparison, the policy evaluation component may determine 608 whether a different policy outcome is generated through use of the provisional policies. For instance, the policy evaluation component may determine whether implementation of the provisional policies would result in an error rate that exceeds a maximum threshold for an acceptable error rate through application of a policy. If the implementation of the provisional policies would result in an error rate that exceeds the maximum threshold for an acceptable error rate, the policy evaluation component may discard the provisional policies and notify 612 the customer of the evaluation outcome.

In some embodiments, if the use of the provisional policies for the previously processed requests does not result in a different policy outcome and/or falls below a threshold for an acceptable error rate, the policy evaluation component can promote 610 the one or more provisional policies to become active policies that the one or more computing resource services in response to requests to obtain policies applicable to incoming user requests received by these services may obtain to evaluate the incoming user requests. The implementation of the provisional policies may supersede the active policies previously utilized to process incoming requests. For instance, the policy management service may determine whether a set of criteria for replacing the active policies with the provisional policies has been fulfilled. The set of criteria may include: an error rate that does not exceed an error rate threshold for processing incoming requests, minimal impact to processing latency, minimal impact to user access to the computing resources, the particular data region in which the provisional policy is applicable, and the like. The computing resource service utilizing the promoted provisional policies may continue to monitor the impact of using the promoted provisional policies for a period of time to identify any issues that may arise through processing of new requests to access the computing resource services. If the provisional policies are implemented in this manner, the policy management service may notify 612 the customer of the evaluation outcome for the provisional policies and inform the customer that the provisional policies have been implemented.

Figure 7:
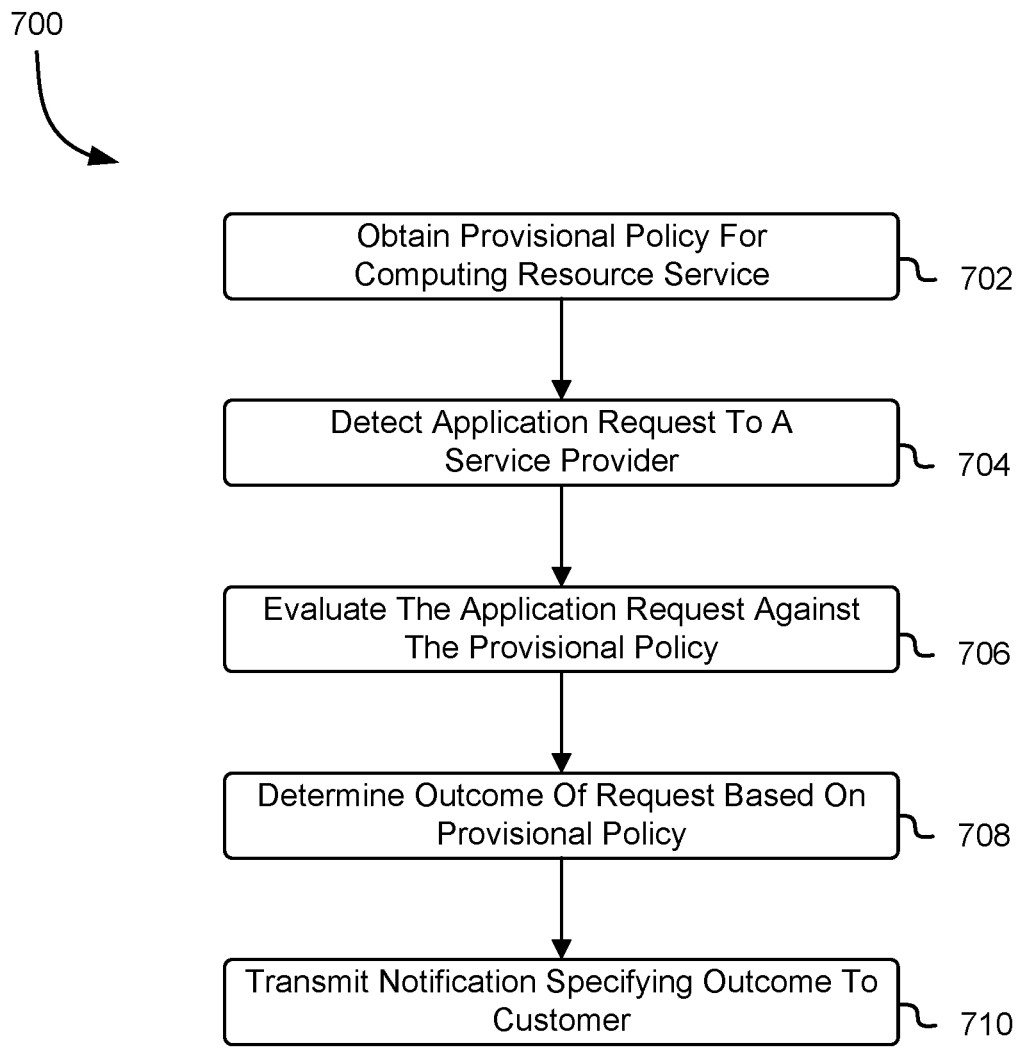
FIG. 7 shows an illustrative example of a process for evaluating application requests against one or more provisional policies to determine the impact of the one or more provisional policies in accordance with at least one embodiment.

In an embodiment, a customer of the computing resource service provider can input the provisional policies into an SDK for an application configured to make requests to the computing resource service provider. The SDK may evaluate the provisional policies against the requests it observes and may report to the customer whether the requests being made by the application would be allowed or denied. Accordingly, FIG. 7 shows an illustrative example of a process 700 for evaluating application requests against one or more provisional policies to determine the impact of the one or more provisional policies in accordance with at least one embodiment. The process 700 may be performed by an SDK of an application used by a customer to submit requests to the computing resource service provider and utilize the provisional policies to determine the impact of the application of these provisional policies.

At any time, a customer may add a provisional policy to the SDK of an application to enable the SDK to evaluate any requests to the computing resource service provider against the provisional policy. Thus, the SDK of the application may obtain 702 the one or more provisional policies from the customer for the one or more applicable computing resource services. As the application is utilized to access the computing resource service provider, the SDK may detect 704 one or more requests submitted by the application to the computing resource provider to access one or more computing resource service or to otherwise access one or more computing resources. As noted above, the computing resource services may obtain one or more active policies that may be used to determine whether the received request is to be fulfilled or denied. The SDK of the application may determine the outcome of this authorization decision and record this outcome for comparison with a possible outcome for the request using the provided provisional policies.

In response to detection of an application request to the computing resource service provider, the SDK of the application may evaluate 706 the application request against the one or more provisional policies to determine the authorization decision that would be received if the one or more provisional policies were to be implemented. For example, the SDK may compare an API call associated with the request against permitted API calls specified by the provisional policy to determine if the request would be allowed. Based at least in part on the authorization decision generated by the SDK, the SDK may determine 708 the outcome of the application request based at least in part on the provisional policy. Further, the SDK may compare this outcome of the application request with the actual outcome of the request determined by the computing resource service provider based at least in part on the active policies used to evaluate the request.

The SDK of the application may transmit 710 a notification to the customer specifying the outcome of the evaluation of the application request performed using the provisional policies specified by the customer. Further, the SDK of the application may include, in the notification to the customer, an indication of any discrepancies in the handling of the application request between the active policies and the one or more specified provisional policies. Thus, the customer may utilize the notification provided by the SDK of the application to determine whether to persist the provisional policies as newly active policies that the computing resource service provider may use to evaluate incoming user requests to access computing resource services and computing resources maintained by these computing resource services. If the customer opts to persist the provisional policies, the customer may submit a request to the computing resource service provider to implement the provisional policies and to supersede the active policies with these provisional policies, making the provisional policies active for future requests.

Figure 8:
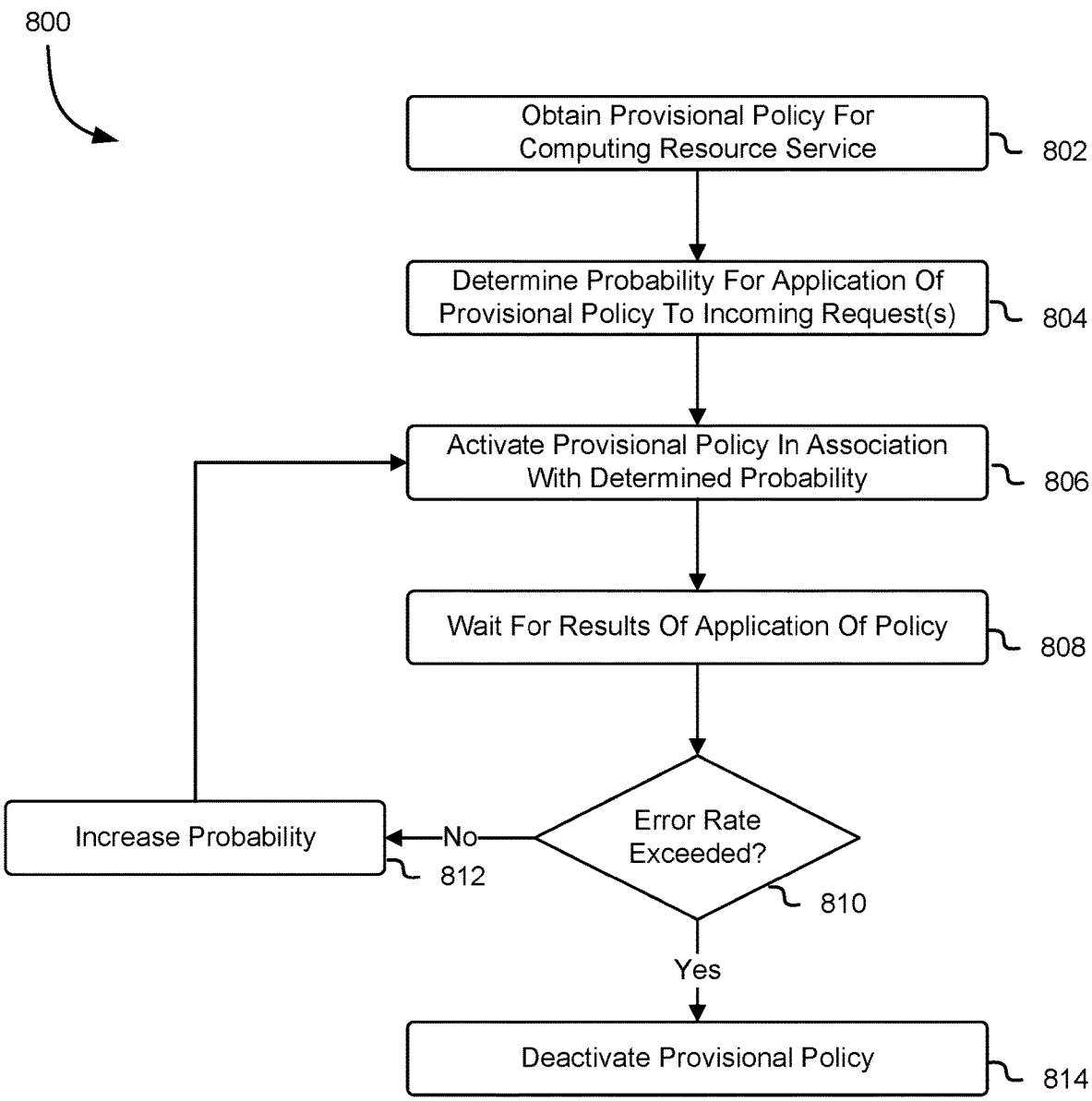
FIG. 8 shows an illustrative example of a process for applying and evaluating a provisional policy to incoming requests based at least in part on a determined probability for application of the provisional policy in accordance with at least one embodiment.

As noted above, the policy management service may receive a request to implement one or more provisional policies subject to a probability for application of the one or more provisional policies. The use of a probabilistic distribution to determine whether to apply the provisional policies to an incoming request may serve to enable evaluation of the provisional policies using actual requests and to identify any potential issues with implementation of the provisional policies before the provisional policies are applied wholesale to incoming requests. Accordingly, FIG. 8 shows an illustrative example of a process 800 for applying and evaluating a provisional policy to incoming requests based at least in part on a determined probability for application of the provisional policy in accordance with at least one embodiment. The process 800 may be performed by the policy management service, which may obtain provisional policies from customers of the computing resource service provider and may select probabilities for application of the provisional policies by the computing resource services. The policy management service may be further configured to evaluate any incoming request logs to determine any impact resulting from application of the provisional policies.

A customer of the computing resource service provider may transmit, to the policy management service, one or more provisional policies that may be applied to one or more computing resource services for determining access to the services and/or computing resources maintained by the computing resource services. The customer may further specify whether the provisional policies are to supersede any active policies for the computing resource services and/or computing resources, in some embodiments, the customer can specify that the provisional policies are to implemented through an incremental process such that the provisional policies may be used to evaluate a portion of the incoming requests obtained by the applicable computing resource services. Thus, the policy management service may obtain 802 the one or more provisional policies for the computing resource service from the customer.

In response to obtaining the one or more provisional policies from the customer, the policy management service may determine 804 a probability for application of the one or more provisional policies to incoming requests. For instance, the customer may provide an initial probability for application of the one or more provisional policies in addition to the provisional policies. Alternatively, the policy management service may be configured by default to utilize a low probability value for implementation and use of the one or more provisional policies. As an illustrative example, the policy management service may determine that only 1% of received requests are to be evaluated against the one or more provisional policies while the remaining requests are to be evaluated against the active policies.

The policy management service may activate 806 the provisional policies in association with the determined probability for use of the provisional policies to enable computing resource services to obtain the active policies and the provisional policies that may be used to process incoming requests. In addition, the policy management service may provide configuration information to the policy evaluation component of any requesting computing resource service in response to a request from the computing resource service to obtain any applicable policies for incoming requests. The configuration information may cause the policy evaluation component of the computing resource service to implement a random number generator or other mechanism to select the provisional policies subject to the assigned probability. For instance, the policy evaluation component may assign a range of numbers to the active policies and to the provisional policies based at least in part on the probabilities assigned to the active policies and the provisional policies. If the random number generator generates a number that falls in the range of numbers assigned to the provisional policies, the policy evaluation component may utilize the provisional policy to evaluate the incoming request.

As the policy evaluation component of the computing resource service evaluates incoming requests using the active policies and the provisional policies subject to the defined probability, the policy management service may wait 808 for any results regarding the application of the provisional policies. For instance, the policy evaluation component may generate one or more logs that may specify the obtained requests, the policies utilized to evaluate the requests, and the outcome of each of the evaluations performed by the policy evaluation component. The one or more logs may further specify any identified errors in implementation of the provisional policies if detected. The policy evaluation component of the computing resource service may transmit these one or more logs to the policy management service for further evaluation.

In response to obtaining the one or more logs from the policy evaluation component, the policy management service may determine 810 whether errors occurring from implementation of the provisional policies exceed a threshold for an allowable policy error rate. For instance, if a percentage of incoming requests processed using the provisional policies results in one or more errors and/or inconsistent results, the policy management service may compare this percentage to the threshold error rate percentage to determine whether the current error rate exceeds this threshold. If the error rate for the provisional policies exceeds the error rate threshold, the policy management service may deactivate 814 the provisional policy and notify the customer of the identified issues with the provisional policies. In some embodiments, the policy management service can reduce the probability for selection of the provisional policies and continue evaluation of the provisional policies to determine its impact.

If the error rate threshold is not exceeded through application of the provisional policies, the policy management service may increase 812 the probability that the provisional policies are selected by the policy evaluation component for evaluation of incoming requests. This may cause more incoming requests to be evaluated using the provisional policies and provide a greater sample size for evaluation of the provisional policies. The policy management service may continue to evaluate any logs obtained from the policy evaluation component to evaluate the error rate for the provisional policies. If the error rate threshold is ever breached, the policy management service may deactivate 814 the provisional policy and notify the customer. However, if the error rate threshold is never breached, the policy management service may continue to increase 812 the probability of the policy evaluation component selecting the provisional policies for evaluation of incoming requests until the provisional policies completely supersede the active policies.

In some embodiments, the policy management service evaluates the processed requests using the provisional policies to determine a mismatch rate between the provisional policies and the active policies. For instance, a customer of the policy management service may define an acceptable mismatch rate for the provisional policies that may be determined based at least in part on the congruence of the policy outcomes. For instance, if using the active policies would result in the requests being allowed and the provisional policies would result in the requests being denied, the policy management service may determine a negative mismatch rate value. Alternatively, if using the active policies would result in the requests being denied and the provisional policies would result in the requests being allowed, the policy management service may determine a positive mismatch rate value. If the policies result in a similar policy outcome, then the policy management service may determine a null (e.g., zero) mismatch rate value. The customer may define one or more mismatch rate thresholds that, if exceeded, cause the policy management service to notify the customer of the evaluation result and to deactivate 814 the provisional policies.

Figure 9:
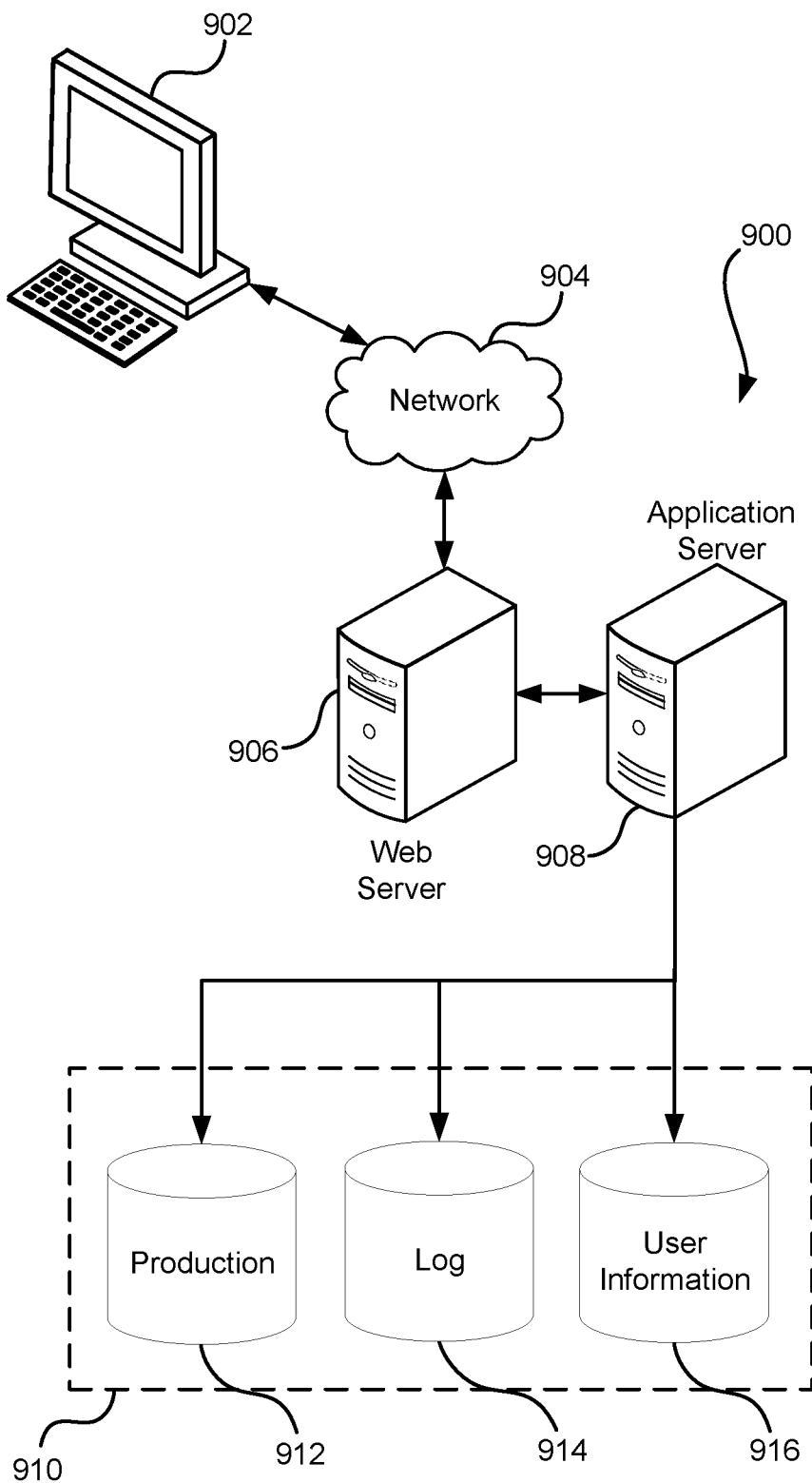
FIG. 9 shows an illustrative example of an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages, or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail.

Communication over the network can be enabled by wired or wireless connections and combinations thereof. In this example, the network includes the Internet and/or other publicly-addressable communications network, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of hyper Text Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by client device to provide the content in one or more forms including, but not limited to, forms that are perceptible to the user audibly, visually and/or through other senses. The handling of all requests and responses, as well as the delivery of content between the client device 902 and the application server 908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("MS"), Common Internet File System ("CIF'S"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("IMP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Peri, Python or TCL, as well as combinations thereof. The server (s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A. B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    receiving a request to access a computing resource;
    determining a set of computing resource policies applicable to the request, the set of computing resource policies including at least an active policy and a provisional policy, the provisional policy being an update to the active policy;
    generating a policy decision by at least evaluating the request using a subset of computing resource policies that excludes the provisional policy, the policy decision indicating whether to provide access to the computing resource in response to the request;
    generating an evaluation result of the provisional policy that indicates whether the policy decision would be different as a result of the provisional policy being applied to the request; and
    providing the evaluation result and the policy decision to an account associated with the computing resource.

2. The computer-implemented method of claim 1, wherein the computer-implemented method further comprises generating a log including information associated with the request and the policy decision; and
    wherein generating the evaluation result includes utilizing the log to determine a second policy decision based at least in part on an inactive policy of the set of computing resource policies.

3. The computer-implemented method of claim 1, wherein the computer-implemented method further comprises selecting the subset of computing resource policies by at least probabilistically selecting the subset of computing resource policies based at least in part on a probability of applying the provisional policy.

4. The computer-implemented method of claim 3, wherein probabilistically selecting the subset of computing resource policies further comprises generating a pseudorandom number and selecting the subset of computing resource policies based at least in part on the pseudorandom number and the probability of applying the provisional policy.

5. The computer-implemented method of claim 1, wherein generating the evaluation result of the provisional policy further comprises applying the provisional policy to the request to generate a second policy decision and comparing the policy decision and the second policy decision.

6. The computer-implemented method of claim 1, further comprising:
  determining an error rate associated with the provisional policy, based at least in part on a first set of policy decisions, of which the policy decision is a member; and
  as a result of the error rate being within a value of a maximum threshold, promoting the provisional policy to become a new active policy.

7. A set of non-transitory computer-readable storage media storing thereon executable instructions that, as a result of being executed by one or more processors of a computer system, cause the computer system to at least:
  in response to a request to access a computing resource, determine a set of policies associated with the computing resource, the set of policies including an active policy and a provisional policy;
  generate a policy decision based at least in part on a subset of the set of policies that excludes the provisional policy; and
  generate an evaluation result based at least in part on the set of policies and the request.

8. The set of non-transitory computer-readable storage media of claim 7, wherein the evaluation result is generated based at least in part on an evaluation request associated with a customer account responsible for maintaining the active policy and the provisional policy.

9. The set of non-transitory computer-readable storage media of claim 7, wherein the instructions that cause the computer system to generate the evaluation result further include instructions that cause the computer system to:
  generate a pseudorandom value; and
  generate the evaluation result that is further based at least in part on the pseudorandom value and a factor associated with the provisional policy.

10. The set of non-transitory computer-readable storage media of claim 9, wherein the pseudorandom value corresponds to a number assigned to implementation of the provisional policy.

11. The set of non-transitory computer-readable storage media of claim 7, wherein the instructions further cause the system to generate a second policy decision based at least in part on the evaluation result, the request, and the policy decision.

12. The set of non-transitory computer-readable storage media of claim 7, wherein the instructions further cause the computer system to generate a log indicating the request, the active policy, and the policy decision.

13. The set of non-transitory computer-readable storage media of claim 12, wherein the instructions that cause the system to generate the evaluation result further cause the computer system to generate the evaluation result based at least in part on the provisional policy and the log.

14. A system, comprising:
  one or more processors; and
  memory including instructions that, as a result of being executed by the one or more processors, cause the system to:
    receive a request to determine an access right to a computing resource;
    obtain a set of policies associated with the computing resource, the set of policies including an active policy and a provisional policy being an update to the active policy;
    generate a policy decision based at least in part on a subset of policies that excludes the provisional policy;
    determine the access right based at least in part on the policy decision; and
    provide an evaluation result based at least in part on the set of policies and the request.

15. The system of claim 14, wherein the memory further includes instructions, that as a result of being executed by the one or more processors cause the system to generate a log entry indicating the request and the access right determined based at least in part on the active policy.

16. The system of claim 15, wherein the memory further includes instructions, that as a result of being executed by the one or more processors cause the system to determine the evaluation result based at least in part on the provisional policy and the log entry.

17. The system of claim 14, wherein the instructions that cause the system to generate a policy decision further include instructions that, as a result of being executed by the one or more processors cause the system to probabilistically generate the policy decision based at least in part on a weighting factor assigned to the provisional policy.

18. The system of claim 17, wherein the memory further includes instructions, that as a result of being executed by the one or more processors, cause the system to adjust the weighting factor based at least in part on a previous evaluation result associated with the provisional policy.

19. The system of claim 14, wherein the instructions that cause the system to provide the evaluation result further include instructions that, as a result of being executed by the one or more processors, cause the system to provide the evaluation result based at least in part on the access right determined in accordance with the active policy differing from a second access right determined in accordance with the provisional policy.

20. The system of claim 14, wherein the memory further includes instructions that, as a result of being executed by the one or more processors, cause the system to deactivate the provisional policy based at least in part on the access right determined in accordance with the active policy differing from a second access right determined in accordance with the provisional policy.

* * * * *